US011120334B1

(12) United States Patent
Carvalho et al.

(10) Patent No.: US 11,120,334 B1
(45) Date of Patent: Sep. 14, 2021

(54) MULTIMODAL NAMED ENTITY RECOGNITION

(71) Applicant: Snap Inc., Santa Monica, CA (US)

(72) Inventors: Vitor Rocha de Carvalho, San Diego, CA (US); Leonardo Ribas Machado das Neves, Marina Del Rey, CA (US); Seungwhan Moon, Bellevue, WA (US)

(73) Assignee: Snap Inc., Santa Monica, CA (US)

( * ) Notice: Subject to any disclaimer, the term of this patent is extended or adjusted under 35 U.S.C. 154(b) by 526 days.

(21) Appl. No.: 16/125,615

(22) Filed: Sep. 7, 2018

Related U.S. Application Data

(60) Provisional application No. 62/556,206, filed on Sep. 8, 2017.

(51) Int. Cl.
| | | |
|---|---|---|
| *G06N 3/08* | (2006.01) | |
| *G06K 9/66* | (2006.01) | |
| *H04L 12/58* | (2006.01) | |
| *H04L 29/08* | (2006.01) | |

(52) U.S. Cl.
CPC ............ *G06N 3/08* (2013.01); *G06K 9/66* (2013.01); *H04L 51/10* (2013.01); *H04L 67/10* (2013.01)

(58) Field of Classification Search
CPC . G06N 3/08; G06K 9/66; H04L 51/10; H04L 67/10; G06Q 10/10; G06Q 50/01; G06Q 50/18; G06F 16/338; G06F 16/2322; G06F 16/24; G06F 16/2428; G06F 16/25; G06F 16/345
See application file for complete search history.

(56) References Cited

U.S. PATENT DOCUMENTS

| | | | | |
|---|---|---|---|---|
| 7,113,848 | B2 * | 9/2006 | Hanson | G06N 3/008 700/245 |
| 8,103,963 | B2 * | 1/2012 | Ikeda | H04M 1/72451 715/764 |
| 2004/0249510 | A1 * | 12/2004 | Hanson | G06F 19/00 700/245 |
| 2007/0038331 | A1 * | 2/2007 | Hanson | B25J 11/0015 700/245 |
| 2013/0106685 | A1 * | 5/2013 | Davis | G06F 16/434 345/156 |
| 2013/0106695 | A1 * | 5/2013 | Davis | G06F 16/00 345/158 |
| 2014/0226053 | A1 * | 8/2014 | Winer | H04N 5/23245 348/333.05 |

\* cited by examiner

*Primary Examiner* — Ninos Donabed
(74) *Attorney, Agent, or Firm* — Schwegman, Lundberg & Woessner, P.A.

(57) ABSTRACT

A caption of a multimodal message (e.g., social media post) can be identified as a named entity using an entity recognition system. The entity recognition system can use an attention-based mechanism that emphasis or de-emphasizes each data type (e.g., image, word, character) in the multimodal message based on each datatypes relevance. The output of the attention mechanism can be used to update a recurrent network to identify one or more words in the caption as being a named entity.

17 Claims, 13 Drawing Sheets

MULTIMODAL NAMED ENTITY RECOGNITION

PRIORITY

This application claims the benefit of priority of U.S. Provisional Application Ser. No. 62/556,206, filed on Sep. 8, 2017, which is hereby incorporated by reference herein in its entirety

TECHNICAL FIELD

Embodiments of the present disclosure relate generally to machine learning and, more particularly, but not by way of limitation, to identifying named entities using machine learning.

BACKGROUND

Information extraction is a computational task in which one or more terms are extracted from a set of data (e.g., a sentence). For example, a user with a voice recognition-enabled dictation device (e.g., a laptop with a microphone and dictation software) can say out-loud, "I travelled to Noe Valley", and the device may use an information extraction scheme to detect that "Noe Valley" (a neighborhood in San Francisco) is the correct entity being discussed instead of "no valley". Information extraction schemes work well when the terms to be detected are input correctly without errors (e.g., typed correctly, pronounced correctly). It can be difficult for information extraction schemes to extract terms on sparse noisy data, such as a social media post consisting of a few words, some of which may be misspelled.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Named Entity Recognition (NER) is an information extraction scheme that attempts to identify that one or more words of text correspond to a named entity. For example, an NER scheme may attempt to identify the term "monopoly" not as a reference to a company cornering a market, but rather as the named board game Monopoly. Further, an NER scheme may be trained to recognize three words as a city "New York City" (a city in America), instead of just recognizing the city as "York" (a city in England). NER schemes work well when trained using a large well-structured dataset. However, it is difficult for an NER scheme to recognize a named entity from a few words, some of which may be intentionally misspelled (e.g., a caption in a social media post: "I luv new yoooooork ctiy!").

A multimodal approach for named entity recognition (NER) task from noisy user generated data, such as social media posts, is disclosed. In the examples discussed below, the social media posts can include a short text caption with or without an accompanying image. The social media posts often use inconsistent or incomplete syntax and lexical notations (e.g., misspelled words, images without metadata tags, such as an image of a city with no location tag), thus overwhelmingly many unknown word tokens may exist, which causes NER to be impractical if not impossible.

To this end, an NER system implements bi-directional long short-term memory unit (Bi-LSTM) word/character based NER model with (1) a recurrent neural network module which incorporates relevant visual context to augment textual information, and (2) a modality attention module which attenuates irrelevant or uninformative modalities while focusing on the primary modality to extract contexts adaptive to each sample and token.

Figure 1:
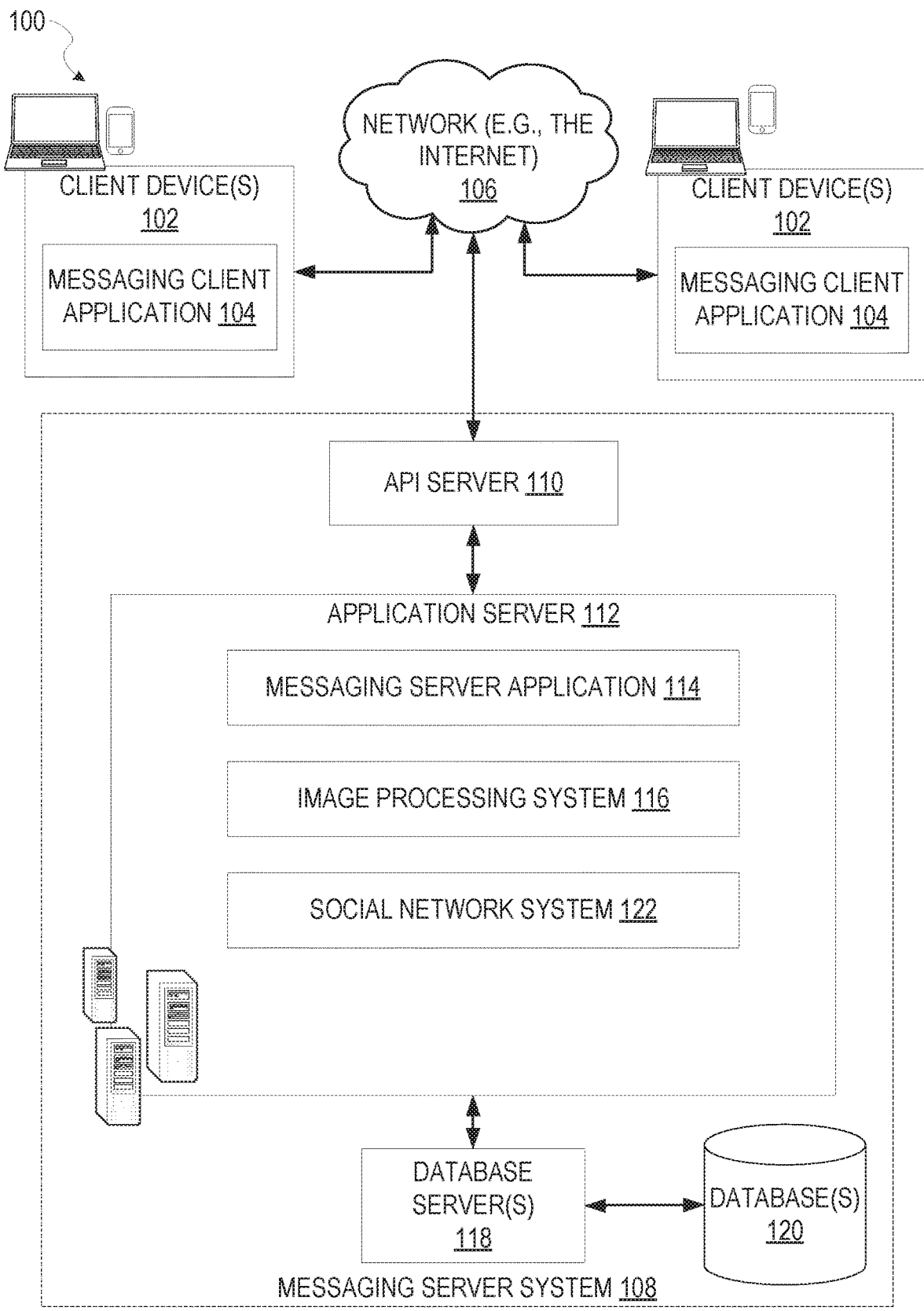
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
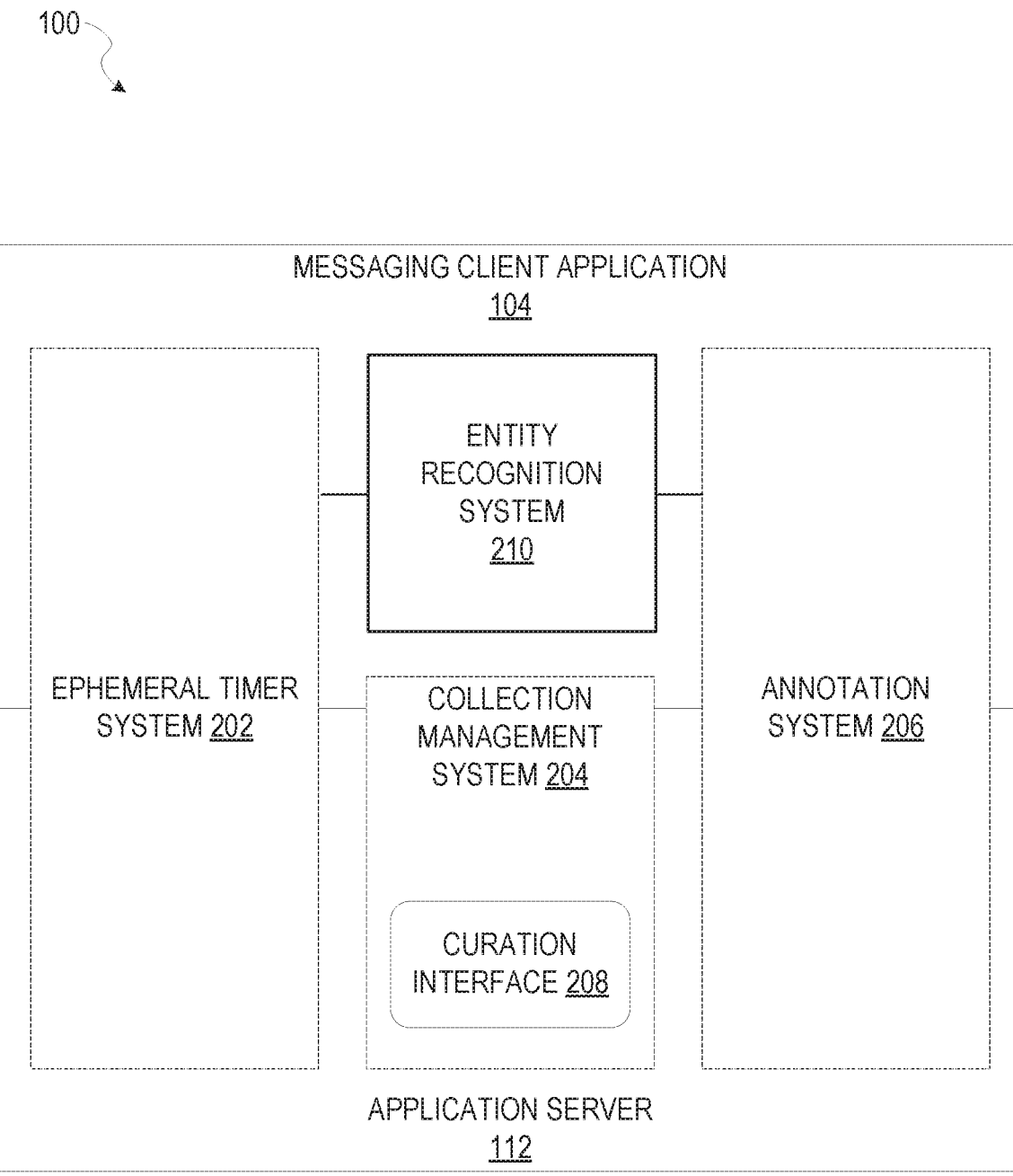
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and an entity recognition system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The entity recognition system 210 comprises one or more neural networks configured to identify an entity referenced by a multimodal message, as discussed in further detail below.

Figure 3:
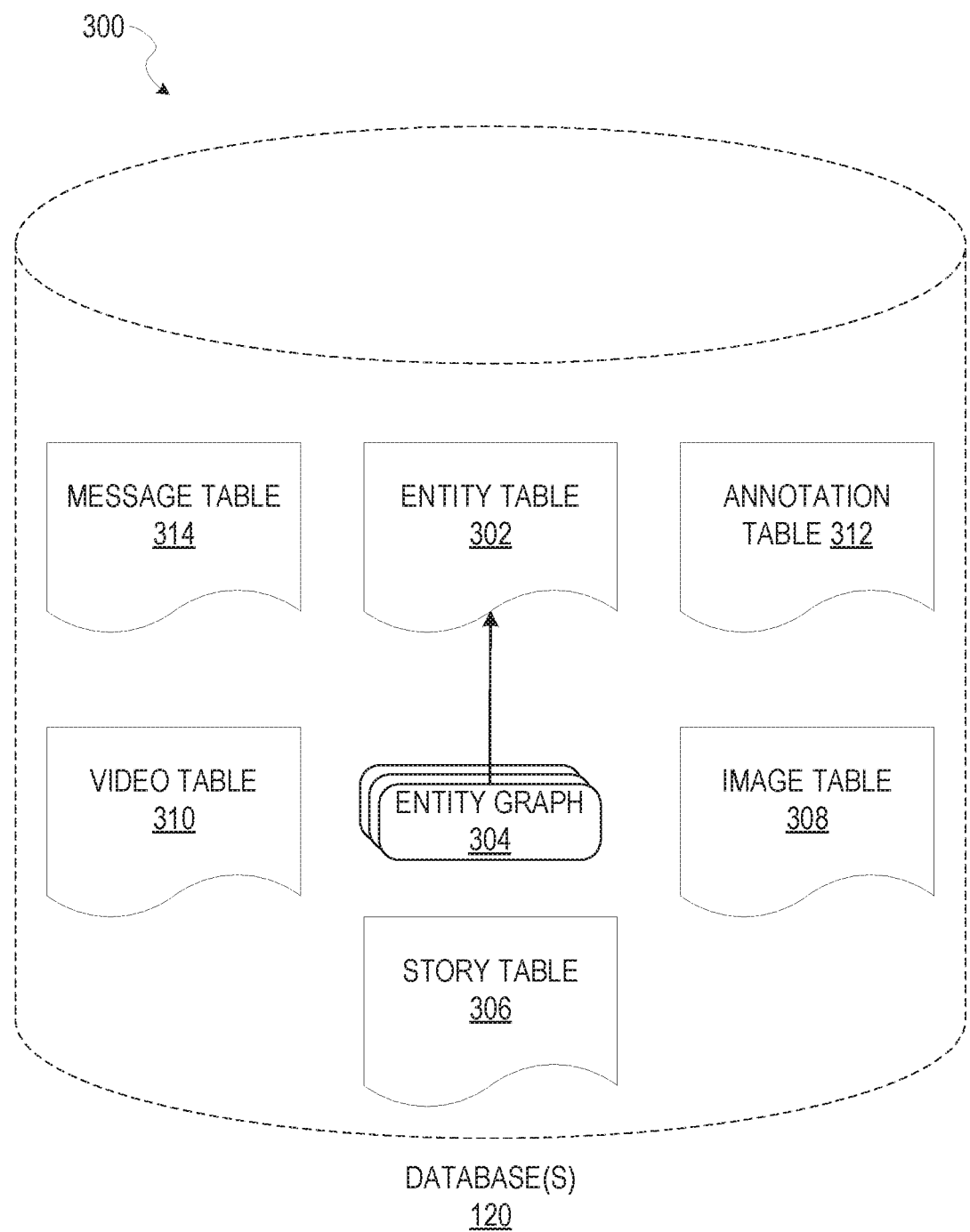
FIG. 3 is a schematic diagram illustrating data that may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
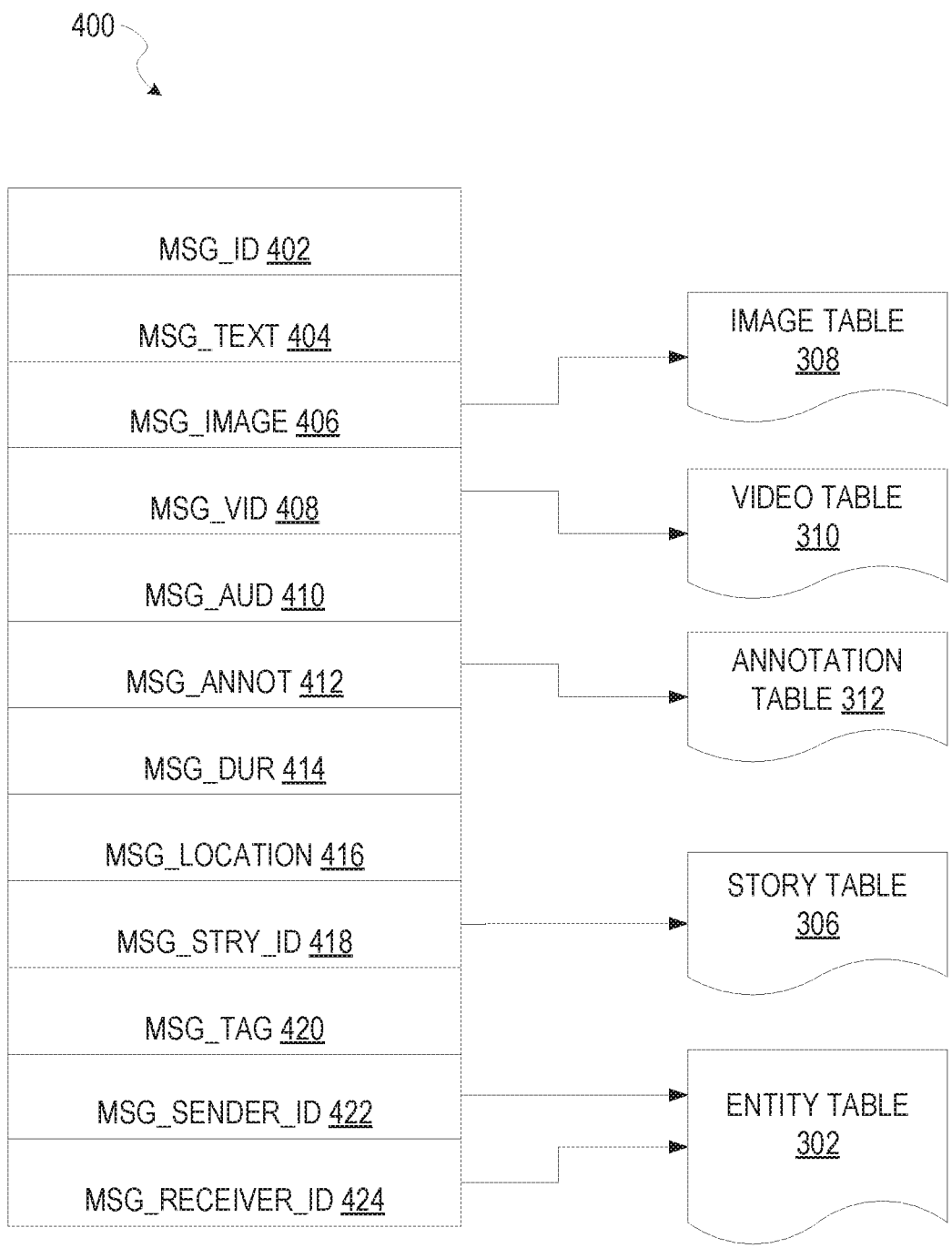
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102, and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
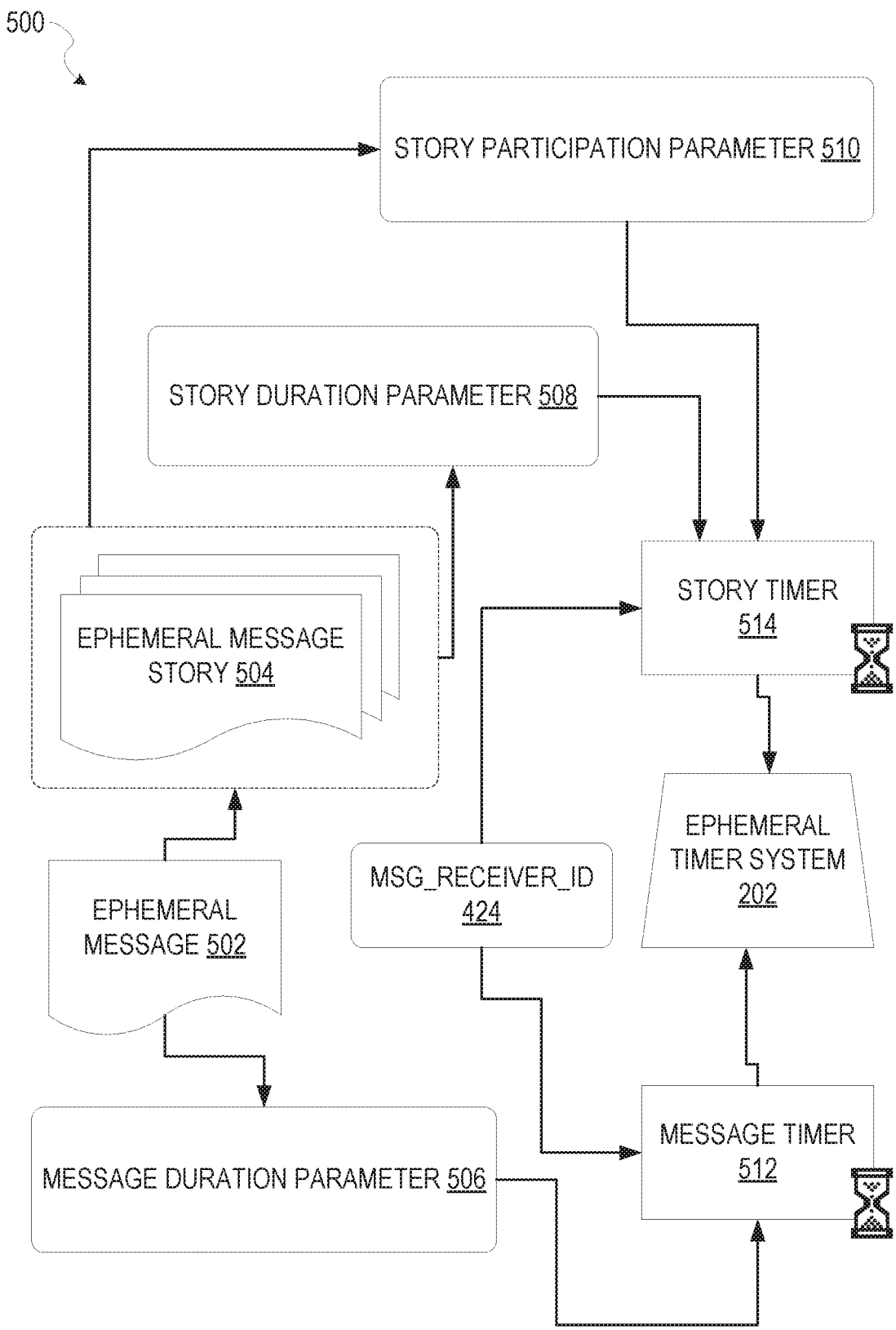
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is social media application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
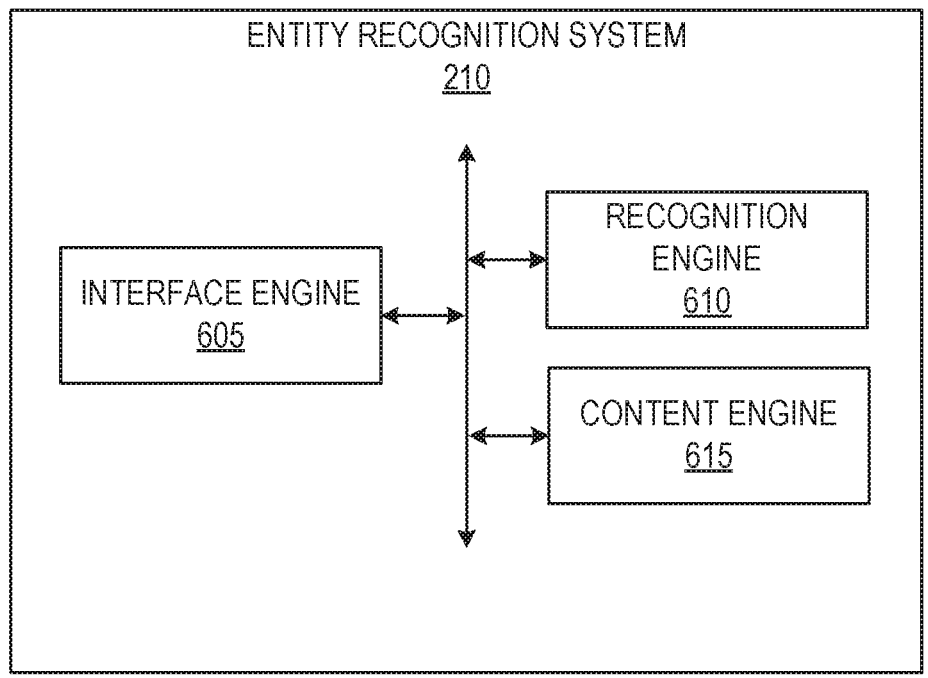
FIG. 6 shows an example entity recognition system, according to some example embodiments.

FIG. 6 shows an example entity recognition system 210, according to some example embodiments. To avoid obscuring the inventive subject matter with unnecessary detail, various functional components (e.g., modules and engines) that are not germane to conveying an understanding of the inventive subject matter have been omitted from FIG. 6. However, a skilled artisan will readily recognize that various additional functional components may be supported by the entity recognition system 210 to facilitate additional functionality that is not specifically described herein.

As is understood by skilled artisans in the relevant computer arts, each functional component (e.g., engine) illustrated in FIG. 6 may be implemented using hardware (e.g., a processor of a machine) or a combination of logic (e.g., executable software instructions) and hardware (e.g., memory and processor of a machine) for executing the logic. Furthermore, the various functional components depicted in FIG. 6 may reside on a single computer (e.g., a laptop), or may be distributed across several computers in various arrangements such as cloud-based architectures. Moreover, any two or more modules of the entity recognition system 210 may be combined into a single module, or subdivided among multiple modules. It shall be appreciated that while the functional components (e.g., engines) of FIG. 6 are discussed in the singular sense, in other embodiments, multiple instances of one or more of the modules may be employed.

As illustrated, the entity recognition system 210 comprises an interface engine 605, a recognition engine 610, and a content engine 615. The interface engine 605 is configured to identify input data, such as a multimodal message (e.g., social media post) generated by application 114. The recognition engine 610 is configured to process data in the input data (e.g., one or more terms in a text caption, an image) to identify a named entity in the input data. The content engine 645 is configured to select overlay content that has been pre-associated with an identified entity. In some example embodiments, the identified entity is transmitted to the annotation system 206 for further processing (e.g., further annotation of an ephemeral message).

Figure 7:
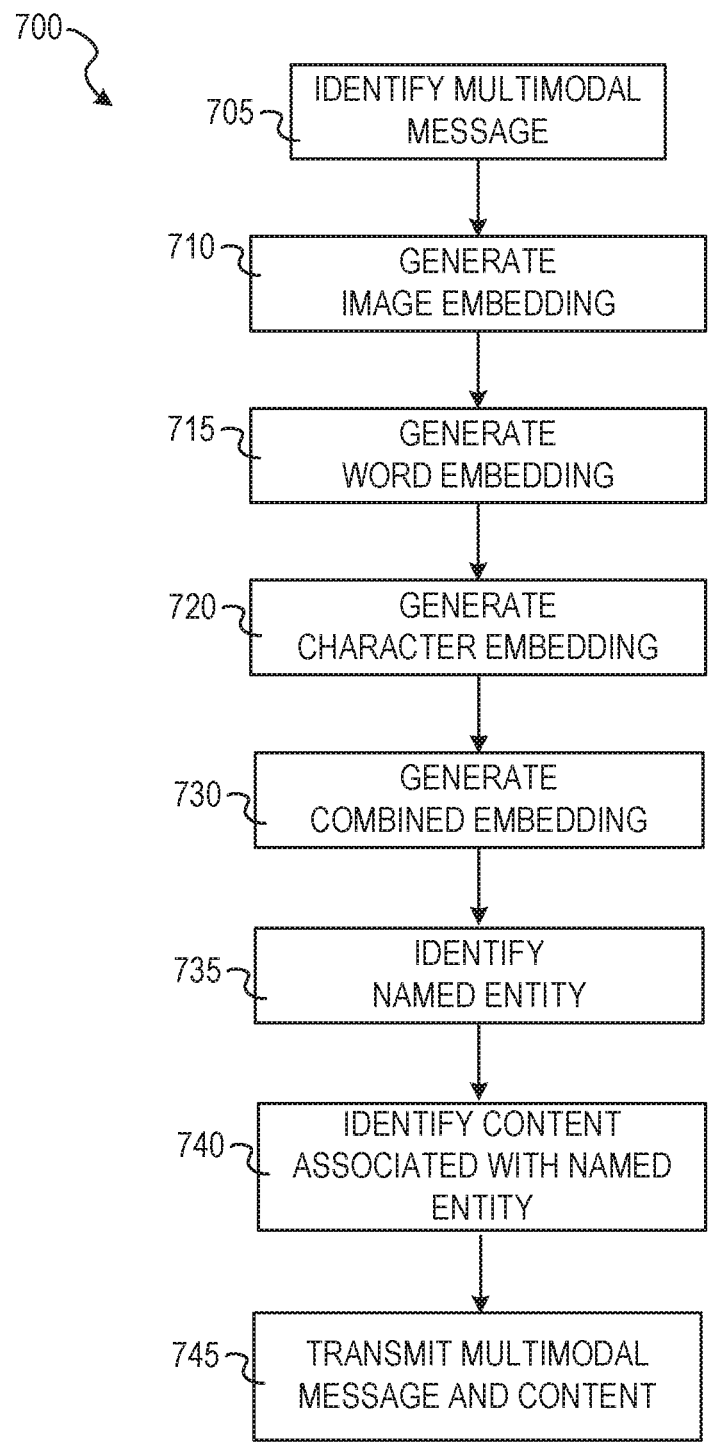
FIG. 7 shows a flow diagram of a method for identifying named entity from a multimodal message, according to some example embodiments.

FIG. 7 shows a flow diagram of an example method 700 for implementing multimodal named entity recognition, according to some example embodiments. At operation 705, the interface engine 605 identifies a multimodal message. For example, at operation 705, the interface engine 605 identifies a social media post containing an image with a caption that describes image. At operation 710, the recognition engine 610 generates an image embedding. For example, at operation 710, the recognition engine 610 generates an image embedding using a convolutional neural network. At operation 715, the recognition engine 610 generates a word embedding from words in the caption, as discussed in further detail below with reference to FIG. 9. At operation 720, the recognition engine 610 generates character embedding from characters in the words of the caption identified at operation 705, as discussed in further below with reference to FIG. 9.

At operation 730, the recognition engine 610 generates a combined embedding from the image embedding, the word embedding, and the character embedding generated at operations 710-720. In some example embodiments, at operation 730, the recognition engine 610 implements a bidirectional recurrent neural network that is trained to place attention or emphasis on embedding modalities that are most relevant to the subject matter of the multimodal message, as discussed in further detail below with reference to FIG. 9. At operation 735, the recognition engine 610 identifies a named entity in the words of the caption of the multimodal message. For example, at operation 735, the recognition engine 610 determines that one or more terms of the caption correspond to a multiword city (e.g., New York City).

At operation 740, the content engine 615 identifies content associated with the identified named entity. For example, at operation 740, the content engine 615 identifies one or more items of overlay content (e.g., user interface content, images, stickers, cartoon avatars, etc.) that is pre-associated with the identified named entity, as discussed in further detail below with reference to FIGS. 10 and 11. At operation 745, the interface engine 605 transmits the multimodal message and the identified content. For example, at operation 745, the interface engine 605 publishes the identified content and the multimodal message as an ephemeral message 502.

Figure 8:
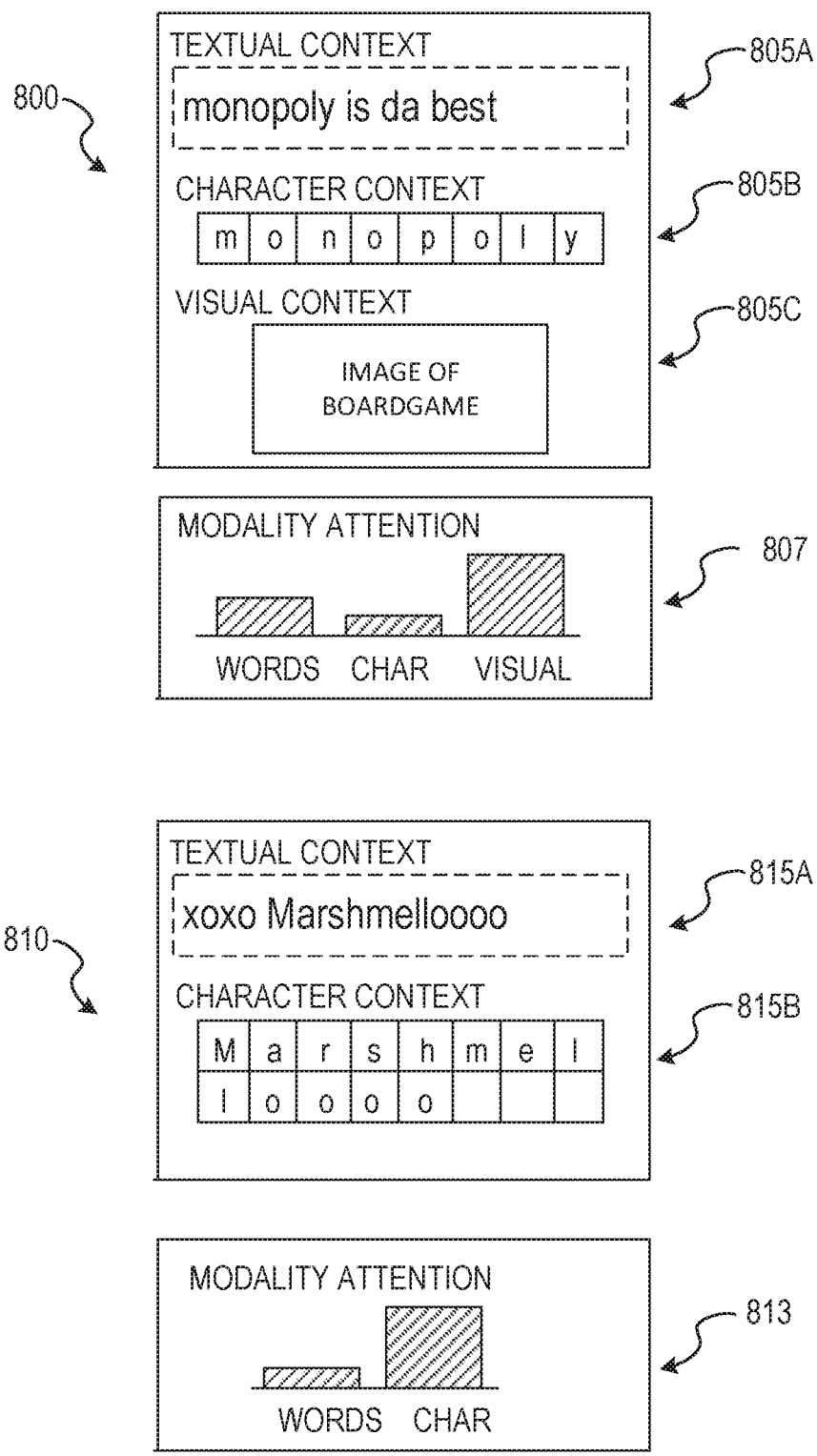
FIG. 8 shows example inputs and results of multimodal messages, according to some example embodiments.

FIG. 8 shows two example multimodal messages 800 and 805, according to some example embodiments. As discussed, several challenges remain for recognizing named entities from extremely short and coarse text found in social media posts. In particular, short social media posts often do not provide enough textual context to resolve polysemous entities. For example, a multimodal message 800 includes textual context caption 805A ("monopoly is da best"), character context data 805B (characters from the words in the caption), visual context data 805C (an image, such as an image of a board game). An NER scheme can have difficulty processing multimodal message 800 because one or more terms in the caption can be polysemous and have different meanings. For example, the term "monopoly" in textual context caption 805A may refer to a board game (named entity) or a term in economics. To this end, the recognition engine 610 can process message 800 to generate modality attention item 807 which emphasizes the visual context data 805C.

An additional challenge stems from noisy misspelled text in messages. Social media posts can create a huge number of unknown word tokens (e.g., embeddings) due to inconsistent lexical notations and frequent mentions of various newly trending entities. For example, multimodal message 810 includes textual context caption 815A ("xoxo Marshmelloooo"), and character context data 815B (characters from the words in the caption). An NER scheme can have difficulty processing multimodal message 810 because "Marshmelloooo" is a misspelling of a named entity: "Marshmello" (a music producer). To this end, the recognition engine 610 can process message 810 to generate modality attention item 813 which attenuates the word-level signal for unknown word tokens (e.g. "Marshmelloooo" with trailing 'o's) and amplifies character-level features instead (e.g. capitalized first letter, lexical similarity to other known named entity token 'Marshmello', etc.), thereby suppressing noise information (e.g., unknown word (UNK) token embedding) in decoding steps. In this way, the recognition engine 610 avoids naive concatenation of mode data, which is vulnerable to noisy social media posts.

Figure 9:
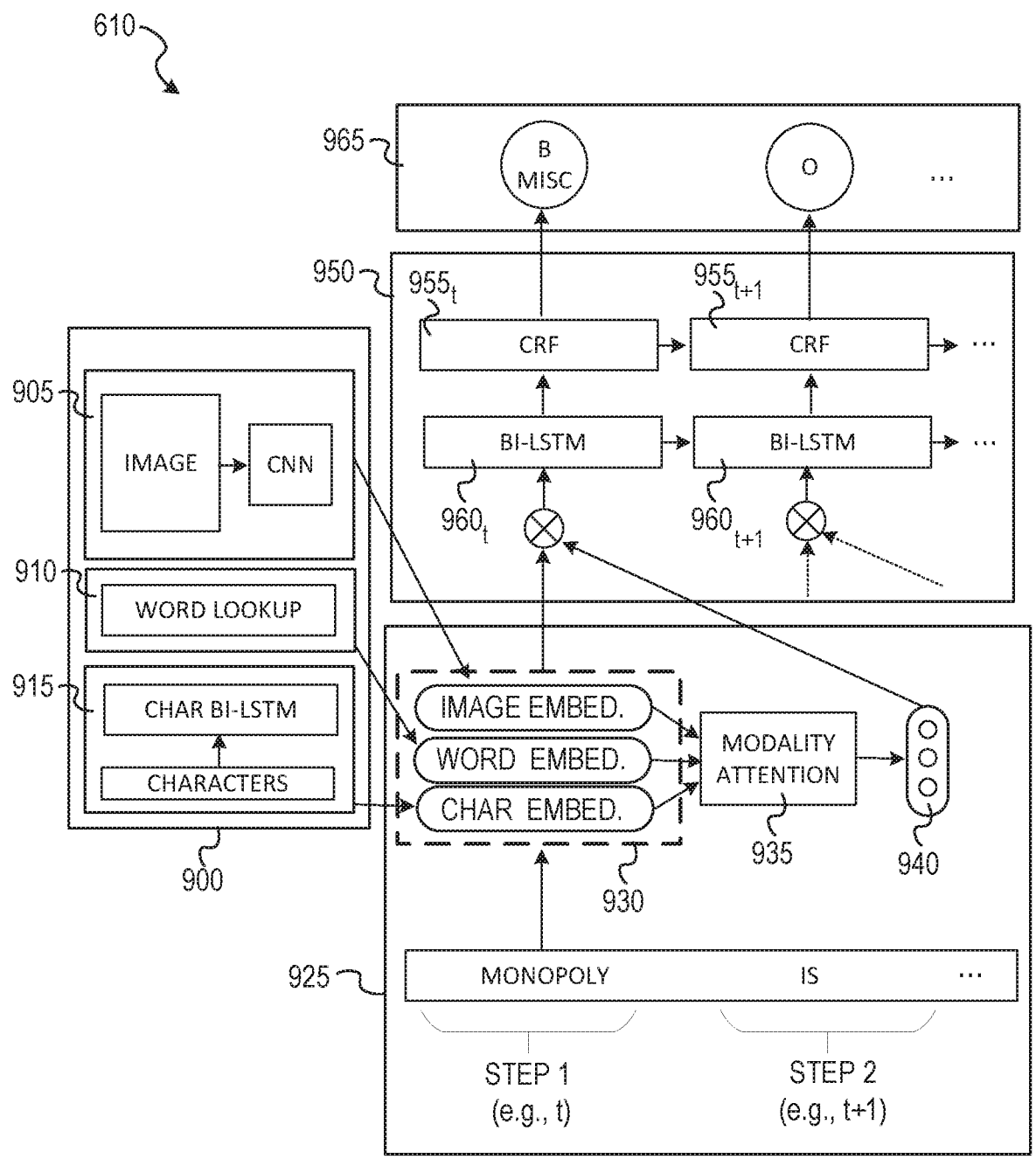
FIG. 9 shows example architecture of an entity recognition system, according to some example embodiments.

FIG. 9 shows an example recognition engine 610, according to some example embodiments. As illustrated, the recognition engine 610 is an entity neural network comprising a feature module 900, attention module 925, hybrid module 950 which produces output data 965. The below discussion adopts the following notations: Let $x=\{x_t\}_{t=1}^T$ a sequence of input tokens with length T, with a corresponding label sequence $y=\{y_t\}_{t=1}^T$ indicating named entities (e.g. in standard BIO formats). Each input token is composed of three modalities: $x_t=\{x_t^{(w)}, x_t^{(c)}, x_t^{(v)}\}$ for word embeddings, character embeddings, and visual embeddings representations, respectively.

Word Embeddings: With reference to the word embedding unit 910 of the feature module 900, word embeddings are obtained from an unsupervised learning model that learns co-occurrence statistics of words from a large external corpus, according to some example embodiments. The trained model learns word embeddings as distributional semantics of words. In some example embodiments, the visual embedding unit 905 implements pre-trained embeddings from Stanford GLobal Vectors for Word Representations (GloVE) model.

Character Embeddings: With reference to the character embeddings unit 915 of the feature module 900, character embeddings are obtained from a Bi-LSTM which takes as input a sequence of characters of each token, according to some example embodiments. In other example alternative embodiments, character embeddings unit 915 generates character embeddings using a convolutional neural network.

Visual embeddings: In some example embodiments, the visual embedding unit 905 implements a modified Inception model (GoogLeNet) (Szegedy et al., 2014, 2015) trained on an ImageNet dataset (Russakovsky et al., 2015) to classify multiple objects in the scene. The modified Inception model comprises deep 22 layers, training of which can be performed utilizing "network in network" principles and dimensional reduction to improve computing resource utilization. The final layer representation encodes discriminative information describing what objects are shown in an image, which provide auxiliary contexts for understanding textual tokens and entities in accompanying captions. In some example embodiments, the visual embeddings are input into the NER decoder (e.g., hybrid module 950) at every step, where each step corresponds to a group of characters separated from other characters by spaces (e.g., each step corresponds to a word from a group of words that form a sentence).

In some example embodiments, each embedding (e.g., character embedding, word embedding, visual/image embedding) is input into a transform layer before transfer to the attention module (e.g., a transform layer of the form $x_t^{(w)}; x_t^{(c)}; x_t^{(v)} := \sigma_w(x_t^{(w)}); \sigma_c(x_t^{(c)}); \sigma_v(x_t^{(v)})$).

The attention module 925 includes a modality attention unit 935 is configured to learn a unified representation space for multiple available modalities (e.g. words, characters, images, etc.), and produce a single vector representation (e.g., input token 940) with aggregated knowledge among multiple modalities, based on their weighted importance, according to some example embodiments.

In some example embodiments, the word and character level contexts are combined by concatenating the word and character embeddings at each decoding step, e.g. $h_t$=LSTM$([x_t^{(w)}; x_t^{(c)}])$. However, this naive concatenation of two modalities (i.e., word and characters) may result in inaccurate decoding specifically for unknown word token embeddings (e.g. an all zero vector $x_t^{(w)}=0$ or a random vector $x^{t(w)}) \in \sim U(-\sigma, +\sigma)$ is assigned for any unknown token $x^t$, thus $h^t$=LSTM$([0; x_t^{(c)}])$ or LSTM$([\in; x_t^{(c)}])$). While this concatenation approach may not yield significant errors for standardized datasets, it can induce performance degradation when applied to social media posts datasets which contain a significant number of missing tokens (e.g., an UNK token).

In some example embodiments, naive merging of textual and visual information (e.g. $h_t$=LSTM$([x_t^{(w)}; x_t^{(c)}; x_t^{(v)}])$) is performed. However, this approach can yield suboptimal results as each modality is treated equally informative, when in some messages the image is irrelevant and not informative.

In some example embodiments, the modality attention unit 930 is configured to adaptively attenuate or emphasize each modality (e.g., attenuate or emphasize each of the embeddings in input embedding 930) as a whole at each decoding step t, and produce a soft attended context vector $\overline{x}_t$ as an input token 940 for processing by the hybrid module 950. In some example embodiments, the modality attention unit 930 is configured as follows:

$$[a_t^{(w)}; a_t^{(c)}; a_t^{(v)}] = \sigma(W_m \cdot [x_t^{(w)}; x_t^{(c)}; x_t^{(v)}] + b_m)$$

$$\alpha_t^{(m)} = \frac{\exp(a_t^{(m)})}{\sum_{m' \in \{w,c,v\}} \exp(a_t^{(m')})} \forall m \in \{w, c, v\}$$

$$\overline{x}_t = \sum_{m \in \{w,c,v\}} \alpha_t^{(m)} x_t^{(m)}$$

where $\alpha_t=[\alpha_t^{(w)}; \alpha_t^{(c)}; \alpha_t^{(v)}] \in R^3$ is an attention vector at each decoding step t, and $\overline{x}_t$ is a final context vector at t that maximizes information gain for $x_t$. Note that the optimization of the objective function with modality attention requires each modality to have the same dimension (e.g., $x_t^{(w)}, x_t^{(c)}, x_t^{(v)} \in R^p$), and that the transformation via $W_m$ enforces each modality to be mapped into the same unified subspace, where the weighted average of which encodes distinguishing features for recognition of named entities.

When visual context is not provided with each token (e.g., a social media post with a caption but no accompanying image), the modality attention unit 935 applies the following scheme:

$$[a_t^{(w)}; a_t^{(c)}] = \sigma(W_m \cdot [x_t^{(w)}; x_t^{(c)}] + b_m)$$

$$\alpha_t^{(m)} = \frac{\exp(a_t^{(m)})}{\sum_{m' \in \{w,c\}} \exp(a_t^{(m')})} \forall m \in \{w, c\}$$

$$\overline{x}_t = \sum_{m \in \{w,c\}} \alpha_t^{(m)} x_t^{(m)}$$

The hybrid module 950 includes a Bi-LSTM 960 and which inputs into a CRF 955, which operate over steps, t. In particular, $$i_t = \sigma(W_{xi} h_{t-1} + W_{ci} c_{t-1})$$

$$c_t = (1-i_t) \text{XNOR } c_{t-1} + i_t \text{ XNOR tan } h(W_{xc} \overline{x}_t + W_{hc} h_{t-1})$$

$$o_t = \sigma(W_{xo} \overline{x}_t + W_{ho} h_{t-1} + W_{co} c_t)$$

$$h_t = LSTM(\overline{x}_t)$$
$$= o_t \text{XNORtanh}(c_t)$$

where $x_t$ is a weighted average of three modalities $x=\{x_t^{(w)}; x_t^{(e)}; x_t^{(v)}\}$ via the modality attention module 935. In some example embodiments, bias terms for gates are omitted for simplicity of formulation.

In some embodiments, a bidirectional entity token representation $\overleftrightarrow{h_t} = [\overrightarrow{h_t}; \overleftarrow{h_t}]$ is obtained by concatenating its left and right context representations. To enforce structural correlations between labels in sequence decoding, $\overleftrightarrow{h_t}$ is then passed to a conditional random field (CRF) to produce a label for each token maximizing the following objective.

$$y* = \text{argmax}_y \ p(y | \overleftrightarrow{h_t}; W_{CRF})$$

$$p(y | \overleftrightarrow{h_t}; W_{CRF}) = \frac{\prod_t \psi_t(y_{t-1}, y_t, \overleftrightarrow{h_t})}{\sum_{y'} \prod_t \psi_t(y'_{t-1}, y'_t, \overleftrightarrow{h_t})}$$

where $\psi_t(y_{t-1}, y_t, \overleftrightarrow{h_t})$ is a potential function, $W_{CRF}$ is a set of parameters that defines the potential functions and weight vectors for label pairs (y', y'). Bias terms are omitted for brevity of formulation.

The model can be trained via log likelihood maximization for the training set $\{(x_i, y_i)\}$:

$$L(W_{CRF}) = \Sigma_i p(y | \overleftrightarrow{h}_i; W_{CRF})$$

Figure 10:
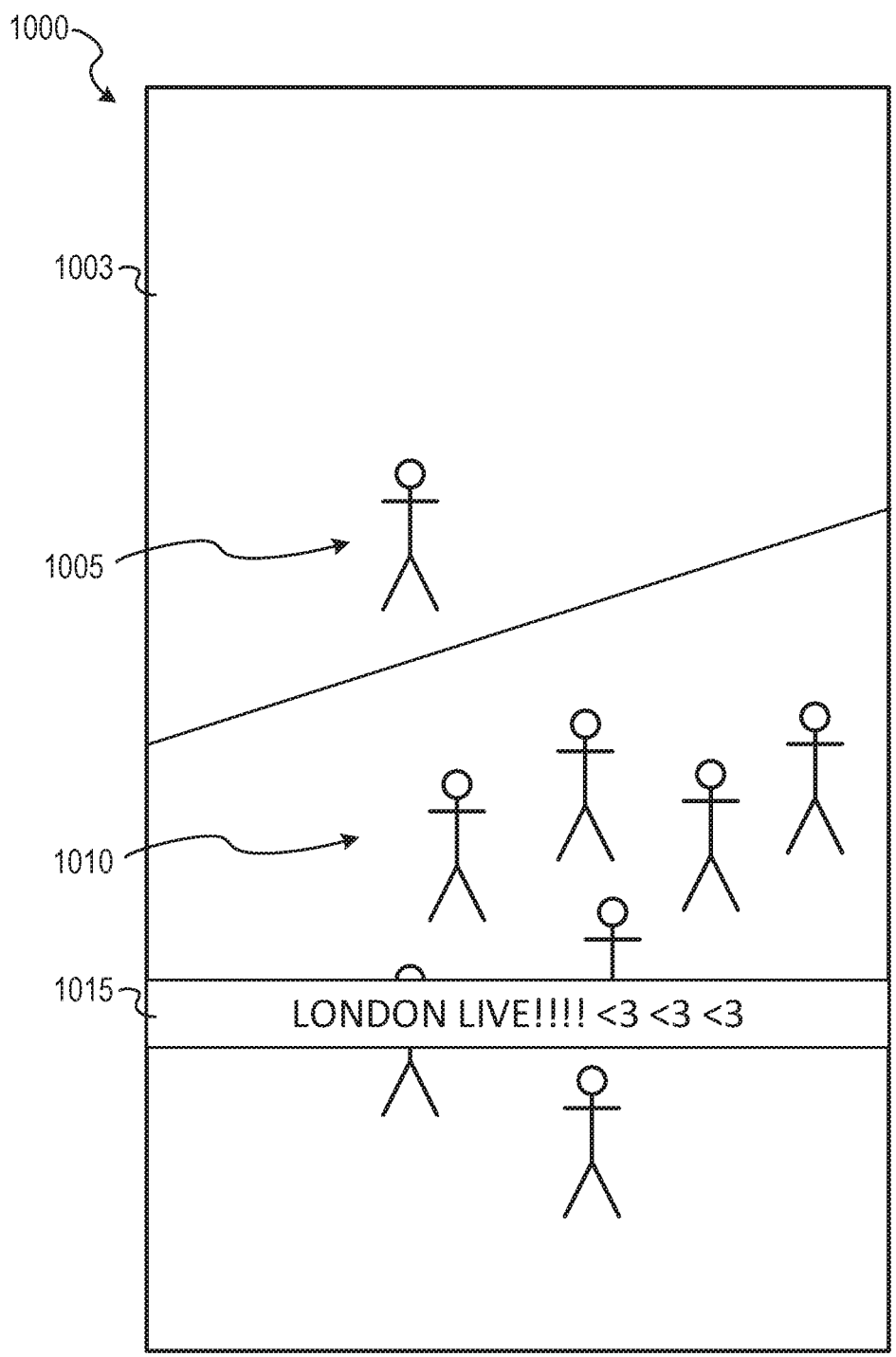
FIGS. 10 and 11 show example multimodal messages implementing an entity recognition system, according to some example embodiments.

FIG. 10 shows an example multimodal message 1000, according to some example embodiments. As illustrated, the multimodal message includes an image 1003, and a caption 1015 that includes one or more words that describe what is going on in the multimodal message 1000. For example, the image 1003 is of an example subject 1005 (e.g., a fictional celebrity/singer London Milton) on a concert stage in front of an audience 1010, and the user (not depicted) has input the caption 1015 with the words "London Live!!!!<3<3<3" as an overlay. Conventional information extraction schemes can struggle to identify the named entity in the caption 1015 due to the term ambiguity. For example, the user could be saying that they are at a restaurant called "London Live", or that they are currently in the city of London, that they intent to live in the city of London (i.e., in the case where intended caption was "London, to live!!!!" but typos occurred), that they are viewing a live show of the singer/celebrity London Milton on stage, and so on.

Figure 11:
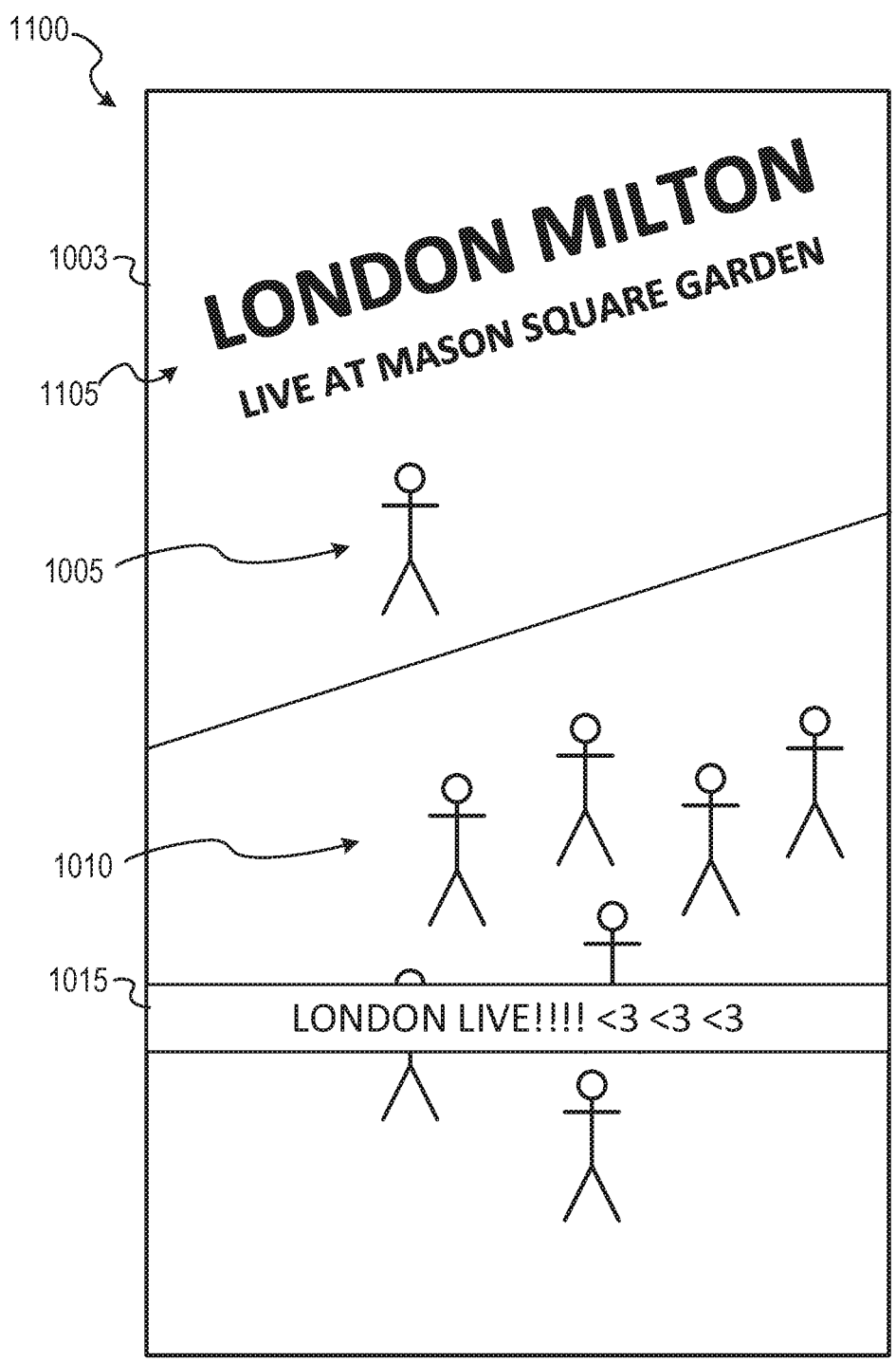

FIG. 11 shows an example modified multimodal message 1100 generated using the system 210, according to some example embodiments. In particular, the system 210 have placed greater emphasis on the image modality (e.g., the input token 878 places emphasis on image information depicting a concert) to identify that the named entity in the caption 1015 is London Milton, the singer/celebrity. In response to recognizing that London Milton is the name entity, one or more items of overlay content 1105 can be recommended to the user, who then may overlay the overlay content 1105 on the multimodal message 1100, which can then be published as an ephemeral message 502. In some example embodiments, each of the potential entities that can be output as the named entity of a multimodal message is pre-associated with overlay content. In those example embodiments, when an entity is identified as the likely subject of a multimodal message, the pre-associated overlay content (e.g., overlay content 1105) can be used to create a modified multimodal message to be published on a social network or otherwise stored to memory of a client device.

Figure 12:
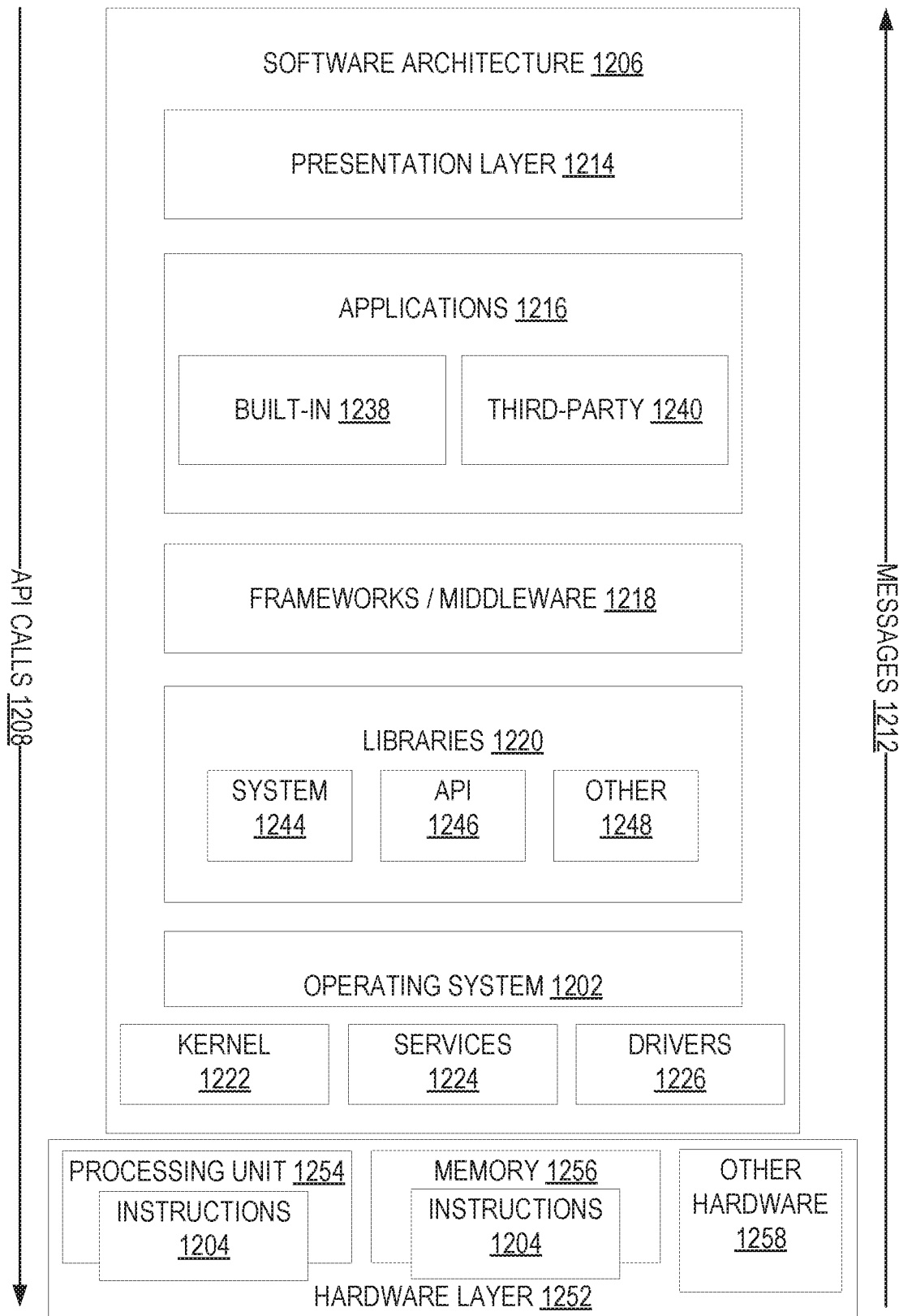
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1120 of FIG. 11 that includes, among other things, processors, memory, and input/output (I/O) components. A representative hardware layer 1252 is illustrated and can represent, for example, the machine 1120 of FIG. 11. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes a memory/storage 1256, which also has the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1211. Operationally, the applications 1216 and/or other components within the layers may invoke API calls 1208 through the software stack and receive a response in the form of messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphical content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems, interactions with a user may occur through a presentation layer, such as the presentation layer 1211. In these systems, the application/component "logic" can be separated from the aspects of the application/component that interact with a user.

Figure 13:
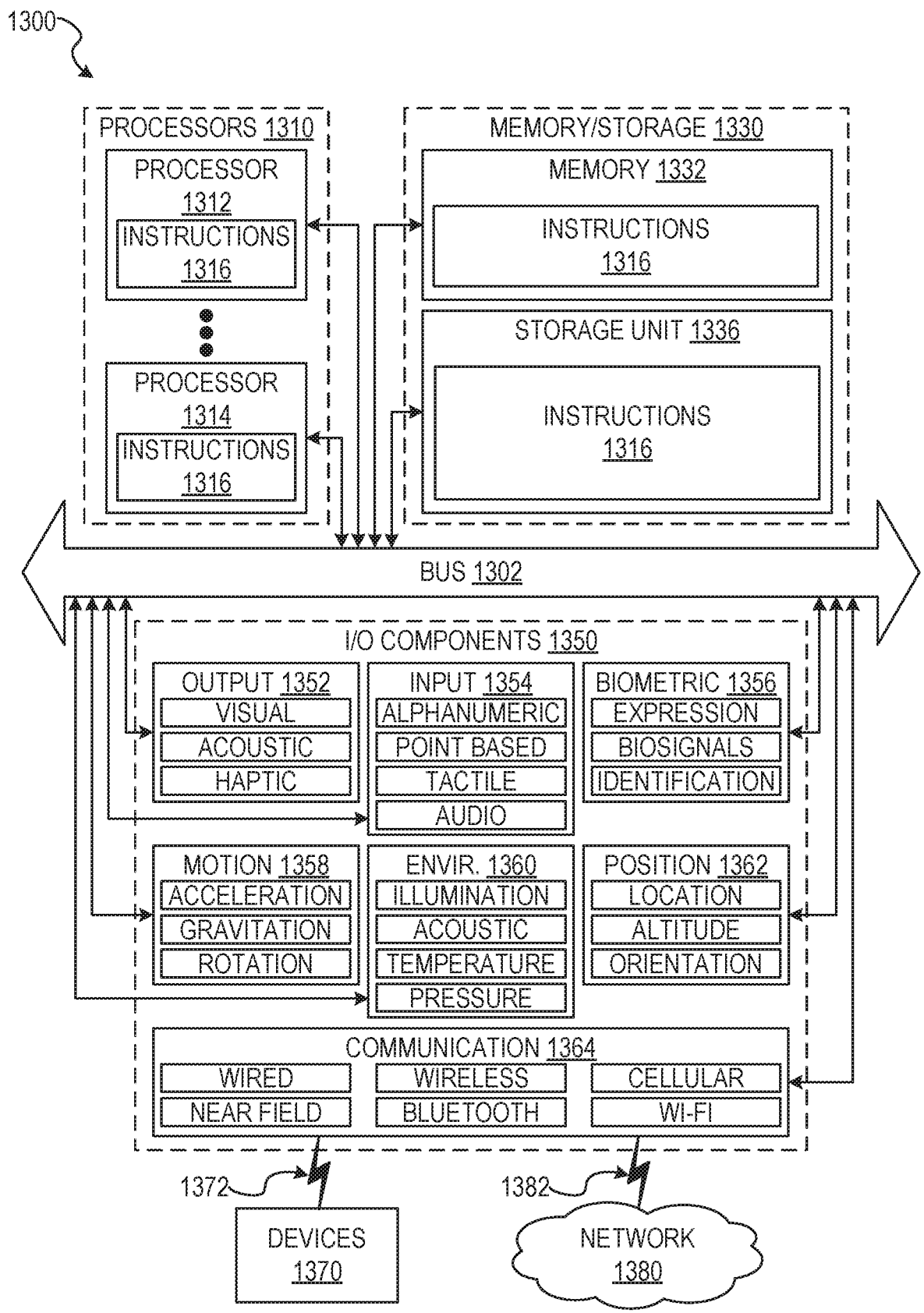
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor cache memory accessible to processor units 1312 or 1314), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1316 for execution by the machine 1300, and includes digital or analog communications signals or other intangible media to facilitate communication of such instructions 1316. Instructions 1316 may be transmitted or received over the network 1380 using a transmission medium via a network interface device and using any one of a number of well-known transfer protocols.

"CLIENT DEVICE" in this context refers to any machine 1300 that interfaces to a communications network 1380 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1380.

"COMMUNICATIONS NETWORK" in this context refers to one or more portions of a network 1380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1380 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions 1316 (e.g., code) for execution by a machine 1300, such that the instructions 1316, when executed by one or more processors 1310 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1312 or a group of processors 1310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1300) uniquely tailored to perform the configured functions and are no longer general-purpose processors 1310. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1312 configured by software to become a special-purpose processor, the general-purpose processor 1312 may be configured as respectively different special-purpose processors (e.g., comprising different hardware components) at different times. Software accordingly configures a particular processor 1312 or processors 1310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented components that operate to perform one or more operations or functions described herein. As used herein, "processor-implemented component" refers to a hardware component implemented using one or more processors 1310. Similarly, the methods described herein may be at least partially processor-implemented, with a particular processor 1312 or processors 1310 being an example of hardware. For example, at least some of the operations of a method may be performed by one or more processors 1310 or processor-implemented components. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an API). The performance of certain of the operations may be distributed among the processors 1310, not only residing within a single machine 1300, but deployed across a number of machines 1300. In some example embodiments, the processors 1310 or processor-implemented components may be located in a single geographic location (e.g., within a home environment, an office environment, or a server farm). In other example embodiments, the processors 1310 or processor-implemented components may be distributed across a number of geographic locations.

"PROCESSOR" in this context refers to any circuit or virtual circuit (a physical circuit emulated by logic executing on an actual processor 1312) that manipulates data values according to control signals (e.g., "commands," "op codes," "machine code," etc.) and which produces corresponding output signals that are applied to operate a machine 1300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1310 may further be a multi-core processor 1310 having two or more independent processors 1312, 1314 (sometimes referred to as "cores") that may execute instructions 1316 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    identifying a multimodal message comprising an image and a string, the string comprising one or more words;
    generating, using an entity neural network, an indication that at least one of the one or more words is a named entity, the entity neural network comprising an attention neural network trained to increase emphasis on one of a plurality of embeddings based on relevance to the multimodal message, the plurality of embeddings comprising an image embedding from the image, and a word embedding and a character embedding that corresponds to the string in the multimodal message, the character embedding corresponding to characters of the one or more words, the one or more words of the multimodal message comprising an incorrectly spelled version of the named entity, and the attention neural network increases emphasis of the character embedding and decreases emphasis of the word embedding;
    storing, using one or more processors of a machine, the named entity as being associated with the multimodal message;

identifying one or more items of user interface content using the named entity; and publishing, on a network site, the multimodal message and the user interface content as an ephemeral message.

2. The method of claim 1, wherein access to the ephemeral message through the network site expires after a period of time.

3. The method of claim 1, wherein the attention neural network is trained on a plurality of multimodal messages, each multimodal message in the plurality of multimodal messages including a training caption and a training image.

4. The method of claim 3, wherein the entity neural network is trained to process image embedding data in iterations, wherein sequential iterations correspond to sequential words in a training caption.

5. The method of claim 4, further comprising:
generating, at each iteration, a combined embedding from the image embedding and the string embedding using the attention neural network.

6. The method of claim 5, wherein the entity neural network comprises a classification neural network that processes the combined embedding generated at each iteration by the attention neural network.

7. The method of claim 6, wherein the classification neural network comprises a bidirectional recurrent neural network.

8. The method of claim 7, wherein the classification neural network comprises a conditional random field layer that receives data output by the bidirectional recurrent neural network at each iteration.

9. The method of claim 1, further comprising:
generating the image embedding using a convolutional neural network.

10. The method of claim 9, further comprising:
identifying a word embedding corresponding to the one or more words.

11. The method of claim 1, wherein the string comprises one or more characters including one or more of: one or more punctuation marks, or one or more emojis.

12. A system comprising:
one or more processors of a machine; and
a memory storing instructions that, when executed by the one or more processors, cause the machine to perform operations comprising:
identifying a multimodal message comprising an image and a string, the string comprising one or more words;
generating, using an entity neural network, an indication that at least one of the one or more words is a named entity, the entity neural network comprising an attention neural network trained to increase emphasis on one of a plurality of embeddings based on relevance to the multimodal message, the plurality of embeddings comprising an image embedding from the image, and a word embedding and a character embedding that corresponds to the string in the multimodal message, the character embedding corresponding to characters of the one or more words, the one or more words of the multimodal message comprising an incorrectly spelled version of the named entity, and the attention neural network increases emphasis of the character embedding and decreases emphasis of the word embedding;
storing the named entity as being associated with the multimodal message;
identifying one or more items of user interface content using the named entity;
publishing, on a network site, the multimodal message and the user interface content as an ephemeral message.

13. The system of claim 12, wherein access to the ephemeral message through the network site expires after a period of time.

14. The system of claim 12, wherein the attention neural network is trained on a plurality of multimodal messages, each multimodal message in the plurality of multimodal messages including a training caption and a training image.

15. The system of claim 14, wherein the entity neural network is trained to process image embedding data in iterations, wherein sequential iterations correspond to sequential words in a training caption.

16. The system of claim 15, the operations further comprising:
generating, at each iteration, a combined embedding from the image embedding and the string embedding using the attention neural network.

17. A machine-readable storage device embodying instructions that, when executed by a machine, cause the machine to perform operations comprising:
identifying a multimodal message comprising an image and a string, the string comprising one or more words;
generating, using an entity neural network, an indication that at least one of the one or more words is a named entity, the entity neural network comprising an attention neural network trained to increase emphasis on one of a plurality of embeddings based on relevance to the multimodal message, the plurality of embeddings comprising an image embedding from the image, and a word embedding and a character embedding that corresponds to the string in the multimodal message, the character embedding corresponding to characters of the one or more words, the one or more words of the multimodal message comprising an incorrectly spelled version of the named entity, and the attention neural network increases emphasis of the character embedding and decreases emphasis of the word embedding;
storing the named entity as being associated with the multimodal message;
identifying one or more items of user interface content using the named entity;
publishing, on a network site, the multimodal message and the user interface content as an ephemeral message.

* * * * *